United States Patent [19]
Bennett et al.

[11] 4,263,751
[45] Apr. 28, 1981

[54] MOUNTING FOR HARDWARE ON AN INSULATED TRAILER DOOR

[75] Inventors: Paul F. Bennett, San Marino; John D. Jacobs, Brea; Robert J. Dixon, Jr., Chino, all of Calif.

[73] Assignee: Utility Trailer Manufacturing Company, Industry, Calif.

[21] Appl. No.: 937,822

[22] Filed: Aug. 29, 1978

[51] Int. Cl.² ............................................... E06B 3/00
[52] U.S. Cl. ....................................................... 49/501
[58] Field of Search ................. 49/501, 381, 400, 503, 49/394; 52/830; 160/232; 16/128 R, 135, 149

[56] References Cited

U.S. PATENT DOCUMENTS

| | | | |
|---|---|---|---|
| 2,871,056 | 1/1959 | Levitt | 49/501 X |
| 2,924,860 | 2/1960 | Parham, Jr. et al. | 49/501 |
| 3,498,001 | 3/1970 | MacDonald | 49/501 |
| 3,604,154 | 9/1971 | Curran | 49/501 |
| 3,885,351 | 5/1975 | Imperial et al. | 49/501 |
| 3,967,671 | 7/1976 | Stanley et al. | 49/501 X |
| 4,118,827 | 10/1978 | Yamamoto | 49/501 X |

*Primary Examiner*—Philip C. Kannan
*Attorney, Agent, or Firm*—Lyon & Lyon

[57] ABSTRACT

An insulated door for a refrigeration vehicle includes spaced walls between which there is an insulation material. Hardware such as hinges and latches are mounted to the door by fastening the hardware to a rigid support mounted on the outside wall of the door, and providing openings in the support for accommodating fastening elements whereby the hardware is affixed to the support and the fastening elements do not thereby penetrate through the door walls.

9 Claims, 6 Drawing Figures

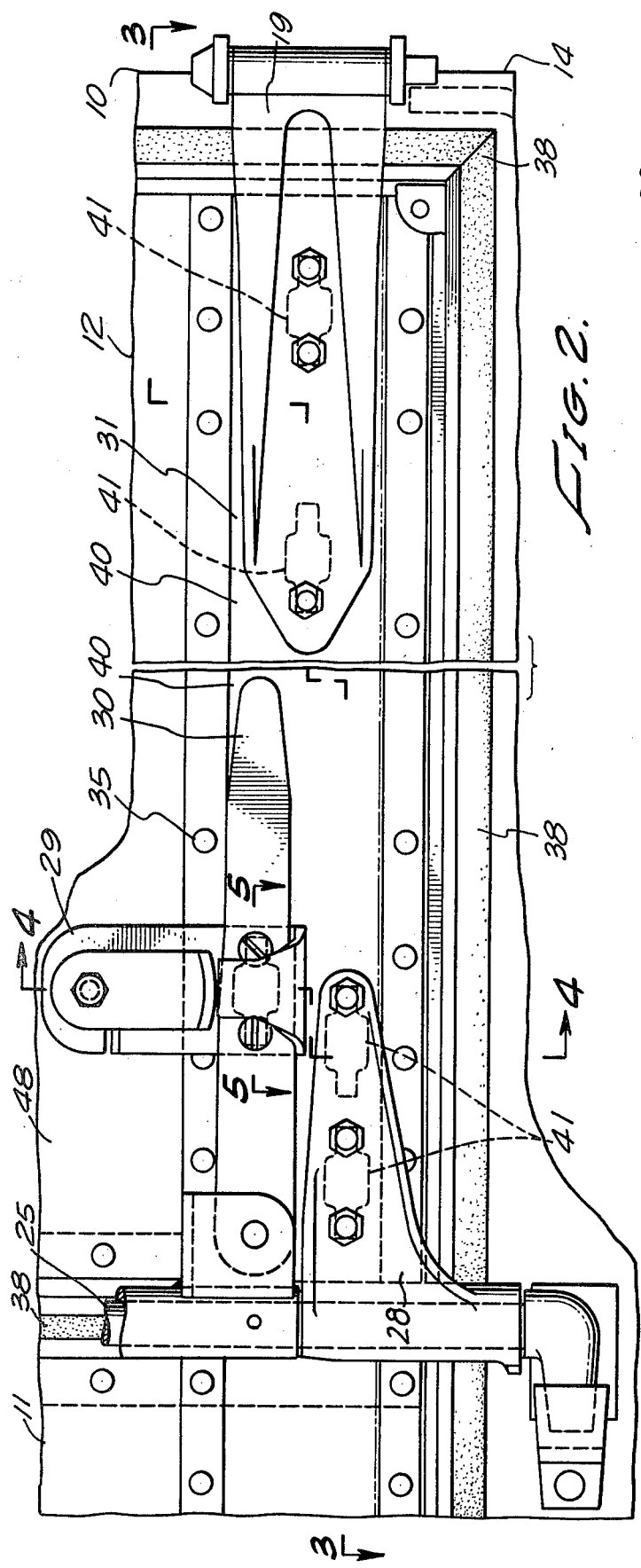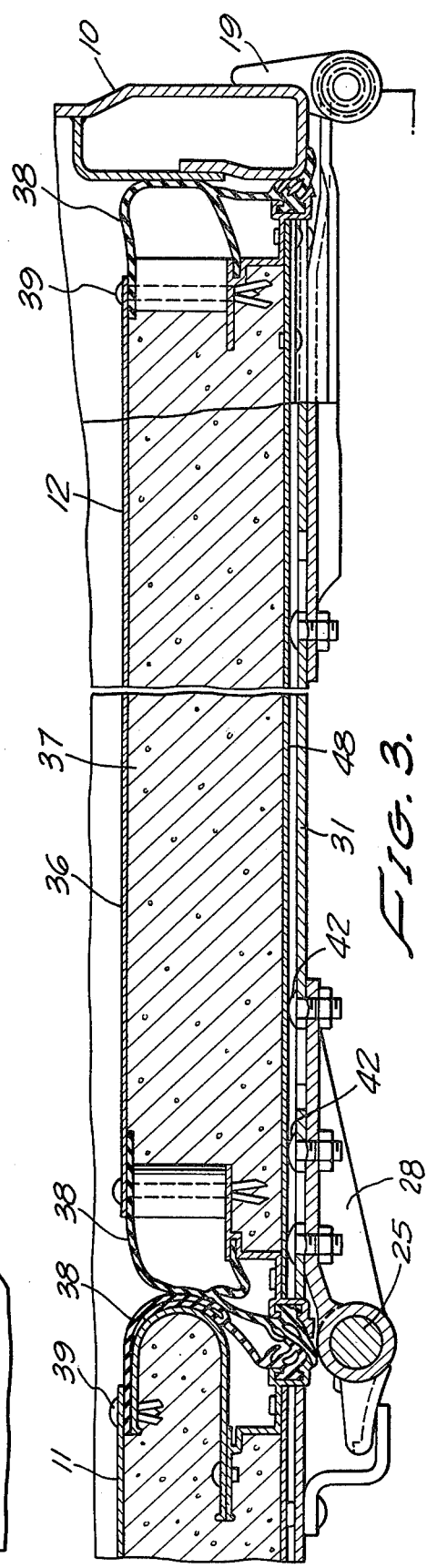

MOUNTING FOR HARDWARE ON AN INSULATED TRAILER DOOR

BACKGROUND OF THE INVENTION

This invention relates to insulated trailer doors such as doors to refrigeration vehicles. In particular the invention is concerned with fastening of hardware to such doors.

By the term hardware the applicant means hinges, door latches, locks and the like. A refrigeration door of the kind with which this invention is concerned and to which the hardware is attached is conventionally constructed by spaced walls between which there is an insulation material such as foamed polyurethane. This material is conventionally formed in situ between the walls. In the foaming process a skin of high density foam forms on the outside of the foam and adjacent the inside of the walls, and this skin effectively acts as a good sealant against the ingress of moisture and thereby prevents any deterioration in the insulating qualities of the foam. Puncturing of the foam and the seal for any reason would consequently cause a deterioration in insulation properties.

The current practice of affixing hardware to the refrigeration door requires the fastening element to be affixed to the outside wall of the door with the nut or head of a bolt fastening device disposed in the body of the foam. Initially when the foam is formed the seal forms around the fastening device and effective insulation is obtained. However, it has been found that in use when a trailer is backed into a loading dock or the like the hardware and fastening devices which are upstanding of the door face are urged inwardly into the foam when the trailer rear abuts the dock. With time, the hardware and fastening devices require replacement and it is then necessary to cut through the foam to extract the fastening devices.

Also in the known art it is conventional to provide a reinforcing or stiffener plate between the walls and in contact with the fastening device so as to insure effective anchorage of the fastening device to the walls. The effect of the stiffening devices is that zones are formed within the cavity in which foaming takes place and as a consequence voids develop during foaming. Less effective insulation is a result.

The walls may be of metal, plywood or of a suitable synthetic plastic material.

As an illustration of the prior art having these disadvantages reference can be had to U.S. Pat. No. 3,003,810.

It is an object of the present invention to provide a mounting for hardware on an insulation door, which, it is believed minimizes the problems and disadvantages currently experienced. According to the invention the means for mounting hardware on such an insulation door includes a support rigidly mounted to the outside wall of the door and openings in the support for accommodating fastening elements which elements fixedly mount the hardware to the support. The support can be constituted by U-shaped cross beams which extend transversely across the trailer door so that a rectangular cavity is formed between the wall of the door and the cross beam element. Openings in the cavity house the head or nut of a fastening element and the remote end of the fastening element passes through a mating aperture in the hardware such that as the fastening element is tightened effective fastening of the hardware to the support is achieved.

Other and more detailed objects and advantages will appear below.

DESCRIPTION OF THE DRAWINGS

In the drawings:

FIG. 2 is an enlarged rear view of a trailer door showing the lower portion of the door.

FIG. 3 is a sectional view taken along lines 3—3 of FIG. 2.

Figure 1:
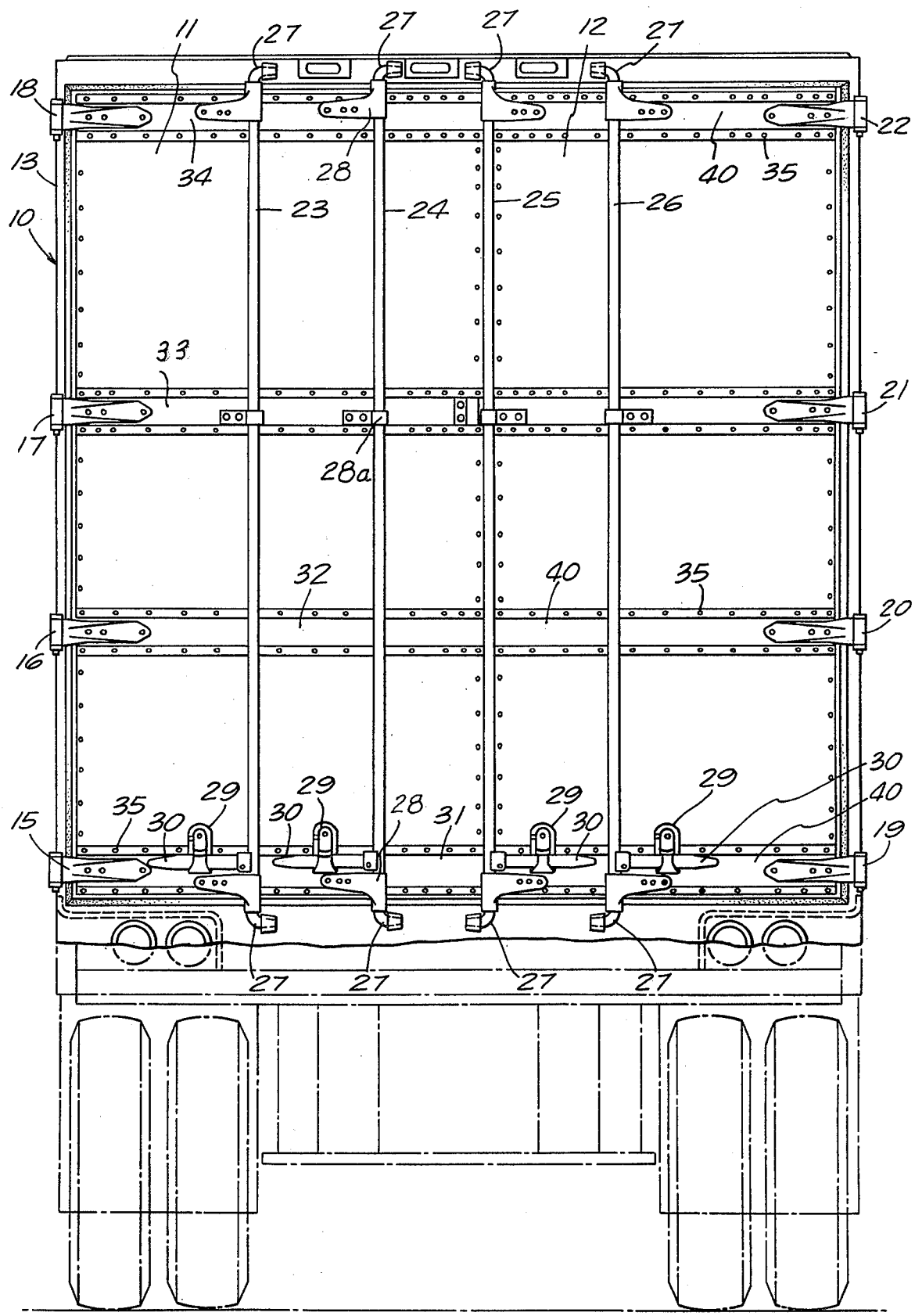
FIG. 1 is rear view of a trailer showing the trailer doors.
Figure 4:
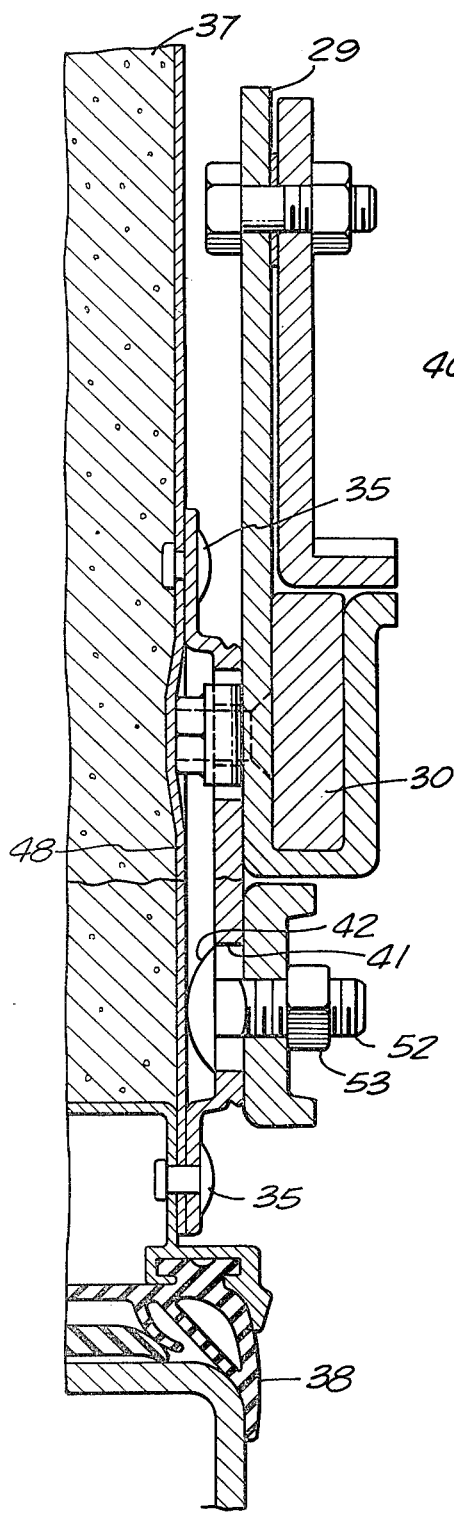
FIG. 4 is a sectional elevation taken along lines 4—4 of FIG. 2.
Figure 5:
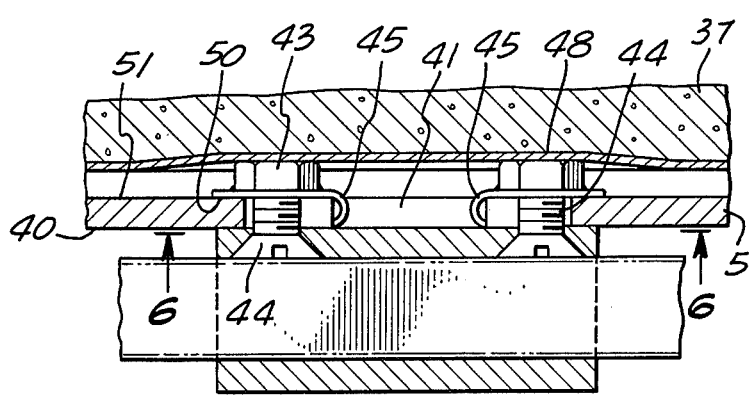
FIG. 5 is a partial sectional plane view taken along lines 5—5 of FIG. 2.
Figure 6:
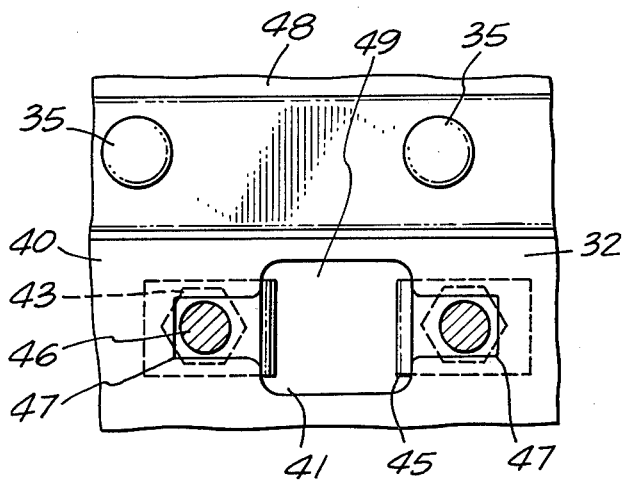
FIG. 6 is a partial side elevation taken along lines 6—6 of FIG. 5.

Referring to the drawings there is provided to insulator trailer 10 two rear insulated doors 11 and 12, respectively. The doors are hinged along sides 13 and 14 of trailer 10, each door having four hinges 15, 16, 17, 18, 19, 20, 21 and 22. Four locking rods 23, 24, 25 and 26 are disposed vertically on the doors 11 and 12 of the trailer 10 and their ends 27 act to latch the locking rods and doors as required.

Hinges 15 through 22, rod supports 28 and 28a holder assembly 29 for door handles 30 constitute the hardware which must be effectively fastened to the doors 11 and 12.

Mounting means for this hardware comprise channel shaped cross beams 31, 32, 33 and 34, respectively. Together with the outer metal wall 48 the cross beams 31 form a substantially rectangular tubular cavity which extends transversely and horizontally across the doors 11 and 12. The cross beams 31, 32, 33 and 34 are riveted along their side edges as indicated by numeral 35 to the outer metal panel 48 to the doors and in this way constitute a rigidly mounted support for the hardware as defined.

The doors are constituted by spaced walls 48 and 36 between which there is a foamed polyurethane 37 which provides the insulation to the doors 11 and 12. At the extremities of walls 48 and 36 there are gaskets 38 which are connected by means of rivets 39 to the door extremities as indicated.

In the face 40 of cross beams 31 through 34 there are keyhole shaped openings 41 for accommodating fastening devices thereby to secure the hardware to the doors.

The fastening devices illustrated which are so accommodated within the space between the cross beam 31 and wall 48 are either the head 42 of a bolt 52 or a nut 43 into which a bolt or screw 44 can be threaded. In the latter example, nut 43 is welded to a clip 45 which is then positioned so that the nut bore 46 is aligned with the narrower portion 47 of keyhole slot 41. The head 42 or nut assembly 43 fits into the keyhole slot 41 through the enlarged opening 49 disposed between the two narrower elongated slots 47. In this fashion the face 50 of nut-clip combination 43-45 abuts against the inner face 51 of wall 31 behind the keyhole slot 47. Effective fastening is thus achieved when the clip 45 is located behind the cross beam 31 and screw 44 is threaded into nut 43. In the former case with the fastening bolt 52, a nut 53 is provided to effect securing of the fastening bolt 52. Hardware is thus affirmatively affixed to the cross beam 31. The nut-clip 43-45 and the head 42, respectively, constitute the projection of the fastening elements. The elongated portion of the bolt 52 and screw 44 constitute the shank of the fastening elements.

With this arrangement of the invention, should it happen that the hardware is subjected to forces urging it towards the doors 11 and 12 no puncturing of the wall 48 will occur and hence the polyurethane insulating material 37 will also not be punctured and the insulation property of the doors will not be impaired by atmospheric moisture. When the hardware is to be replaced the fastening bolts 52 and screws 44 and nuts 53 and 43, respectively are loosened as required, the hardware removed, the fastening devices slipped out through the enlarged opening 49 and new fasteners and hardware can be fitted. No incision need be made into the polyurethane insulation 37.

It will also be noted that the area between walls 48 and 36 is substantially free of obstructions and thus when filled with foaming material voids should not be created in the door body and thus optimum insulation should be achieved. The froth foam method applied in a completed closed cavity through a small hole is itself advantageous since the sandwich type effect and high density skin formed on the periphery of the foam will provide, with walls 48 and 36, a resistance to bending and twisting and an effective seal in that the door will be substantially one contiguous entity. Without the effective seal the foam will tend to absorb water, reducing insulation efficiency plus increasing door weight thereby reducing potential payload.

Having fully described our invention, it is to be understood that we are not to be limited to the details herein set forth but that our invention is of the full scope of the appended claims.

We claim:

1. A mounting for hardware on an insulated door for a refrigeration vehicle wherein the door includes spaced walls between which there is an insulation material, the mounting comprising a horizontal channel shaped beam rigidly secured only to the outside wall of the door, openings in the beam, and fastening elements affixedly mounting hardware to the beam.

2. The mounting as claimed in claim 1, wherein the beam includes a plate riveted to the outside wall of the door and spaced from the wall, and the fastening elements are constituted by a shank element with a fastener projection connectable to the shank in the space between plate and wall housing the projection of the fastening elements.

3. The mounting as claimed in claim 2 including a keyhole slot in the beam, the slot having an opening of wider cross section for entry of the projection of the fastening element into the slot and a narrower section in the slot into which the shank of the fastening element slides and against the walls of which the projection of the fastening element abuts.

4. The mounting as claimed in claim 3 wherein a narrower section is provided at opposed ends of the opening so that two fastening elements may be accommodated in each keyhole slot.

5. The mounting means as claimed in claim 4 wherein the space between the walls is retained substantially regular and obstruction free thereby minimizing the creation of pockets devoid of insulation material when the material is disposed between the walls.

6. On an insulated door of a refrigeration vehicle wherein the door includes spaced walls between which there is an insulation material, hardware mounting means comprising channel shaped cross brace elements extending substantially horizontally across the door and affixed to the outside wall of the door thereby to form an extended transverse cavity across the face of the door, spaced keyhole slots in the face of the channel elements parallel to the wall, the slots being located with mating openings in hardware to be fastened to the channel elements.

7. The mounting as claimed in claim 6 wherein the keyhole openings provide an expanded central aperture and narrower slots to each side of the expanded aperture so that a pair of fastening elements can be accommodated in each opening, and the hardware is provided with mating keyhole openings.

8. The mounting as claimed in claim 7 wherein the space between the walls is retained substantially regular and free of mounting and reinforcement obstructions thereby minimizing the creation of pockets devoid of insulation material when the material is disposed between the walls.

9. A mounting for hardware on the door of a refrigeration vehicle wherein the door includes spaced walls between which there is an insulation material, the mounting comprising a support rigidly secured to the outside wall of the door and openings in the support for accommodating fastening elements, the elements affixedly mounting the hardware to the support, and wherein the support includes a channel cross brace secured to the outer wall, the channel containing positioned keyhole openings, and the fastening elements being bolt and nut means, the bolt head or nut being located behind the keyhole opening in the space between the outer wall and cross brace, and the bolt shank threadingly engages with the nut thereby affixing the hardware to the support.

* * * * *